United States Patent Office 3,695,902
Patented Oct. 3, 1972

3,695,902
EDIBLE FILMS AND CASINGS OF COLLAGEN AND CASEIN
Joseph L. Shank, 4110 206th St., Matteson, Ill. 60443
No Drawing. Application Sept. 18, 1969, Ser. No. 859,480, now Patent No. 3,533,817, dated Oct. 13, 1970, which is a continuation of application Ser. No. 570,758, Aug. 8, 1966. Divided and this application May 28, 1970, Ser. No. 41,615
Int. Cl. A22c 13/00
U.S. Cl. 99—176
9 Claims

ABSTRACT OF THE DISCLOSURE

A method of preparing continuous edible films from mixtures containing collagen and casein which are pressure sealable and formable into tubes or casings is disclosed herein. A flowable paste of about one part collagen to from about 0.2 to 4 parts casein is treated with a material selected from the group consisting of a plasticizing agent and a lubricating material. The resulting flowable paste is cast to a form a continuous film and then dried. The dried film may be further processed by sealing the edge of the film to form a tube or casing and then treating the tube with a good grade cross-linking agent.

This application is a division of earlier filed application Ser. No. 859,480 now Pat. No. 3,533,817 filed Sept. 19, 1969, which is a continuation application of application Ser. No. 570, 758 filed Aug. 8, 1966, and now abandoned.

This invention relates to new compositions of matter comprising mixtures of collagen and casein and to the method for preparing these compositions. More specifically, is relates to collagen-casein compositions which may be utilized as edible casings particularly in the manufacture of meat products of the sausage family.

Today, commercially available collagenous casings are generally prepared by extruding filtered, acid-swollen collagen gels under great pressure through specially designed dies. Such a process is required for continuous tube formation due to the high viscosities of these gels. Obviously, this process entails a considerable capital cost for machinery and dies. Furthermore, one is limited to the preparation of casings having specific, fixed diameters since only those sizes can be prepared for which a die is available.

It has also been proposed that sheets or webs of material could be manufactured from natural animal materials, such as chitterlings, or artificial collagen substitutes, such as cellulose or plastics, and then joined to form casings by the application of heat and/or a suitable bonding agent. Such proposals have been disadvantaged due to weak material strength and relatively complicated bonding requirements.

Accordingly it is a principal object of the present invention to provide an improved material and method for the manufacture of casings.

It is another object of the present invention to provide an improved sheet material for the manufacture of casings that is pressure sealable and will not require heat or other agents for bonding into tubular form.

It is still another object of the present invention to provide new compositions of matter comprising mixtures of collagen and casein.

A further object is to provide a method for preparing these new compositions.

Another object of the present invention is to provide new and improved edible collagen-casein casings which are pressure sensitive and upon moistening, the edges can be formed into continuous tubes having any desired diameter.

A still further object is to provide a new method for preparing casings which will be more economical than methods known heretofore and which will enable one to prepare casings having any diameter desired without undue cost.

Additional objects, if not specifically set forth herein, will be apparent to one skilled in the art from the following detailed description of the invention.

Generally, the present invention comprises the preparation of collagen-casein compositions. The term collagen as employed herein is meant to embody native or undenatured collagen material as distinct from collagen derivatives such as glue, gelatin and the like. Initially, when collagen and casein are combined a flowable paste is formed. These flowable pastes are dried and processed into continuous, flexible sheets or films. These resulting films can be used as edible sheets or can be sliced into edible ribbons for binding food products such as roasts. But, of primary importance is the fast that these films have been found to be pressure sensitive and can be formed into continuous tubes by mearly moistening the edges of the sheet and pressure sealing them. These tubes, after treatment with a cross-linking agent, can be utilized as edible casings primarily in the manufacture of meat products of the sausage family.

The advantages of this procedure in the preparation of edible casings is apparent. Aside from the lower capital cost necessary to produce the desired casings and the unlimited diameter casings which can be prepared at a considerable saving in cost, the obvious adaptability of this process to mechanization is a great advantage to the producers of food items requiring edible casings and particularly to manufacturers of such sausage-type products as frankfurters, weiners, pork sausages, bolonga, salami, thuringer, Bratwurst and the like.

More particularly, the present invention comprises mixing, blending or homogenizing collagen and casein, taking care not to excessively diminute the collagen fibers, in a slurry to form a flowable paste. It may also be desirable to incorporate a small amount of a sofening or plasticizing agent such as a polyoxy alkylene glycol resin, sorbitol, glycerin, dextrin, sucrose, glucose, into the collagen-casein mixture. The pH of the slurry should be such as to be sufficient to dissolve the casein. Particularly suitable pH ranges have been found to tbe basic pH's in the range of from about 8 to about 11 and acid pH's in the range of from about 1.5 to about 3.5. Suitable alkaline materials which may be added to the slurry to adjust the pH to the desired basic range are ammonia, sodium hydroxide, potassium hydroxide and any other appropriate well known bases. Suitable acids which may be utilized to adjust the solution to the desired acid pH range are hydrochloric acid, sulfuric acid, lactic acid and other well known organic and inorganic acids. Also, in order to avoid denaturation and weakening of the collagen, the temperature of the solution should be below about 25° C., although temperatures as high as 40° C. are operable.

Once the flowable paste has been prepared, it is dried by any convenient method. For example, the flowable paste may be cast as a film by gravity or with positive pressure on a continuous hot air belt, where it is dried and removed as a continuous sheet. This sheet can then be formed into continuous tubes to be utilized as food casings. An exemplary procedure which may be employed in forming these tubes is to pass the continuous film under light tension through wet pads to moisten the edges of the sheet. The edges may then be led together and overlapped and sealed with a pressure roller. The pressure required must be sufficient to fuse the two layers together without grossly distorting the overlap. The diameter of the tubes or casings prepared in this manner are limited only by the width of the collagen-casein sheet itself.

After the sheets have been formed into tubes, it is necessary to treat them with a food grade cross-linking agent. Prior to this treatment, the film has good tensile strength but has little resistance to moisture and will disintegrate in the presence of substantial amounts of water. But, upon treatment with the cross-linking agent, the film becomes resistant to moisture while retaining its high tensile strength. It has been found that this treatment with a cross-linking agent must be performed subsequent to sealing of the tube since after cross-linking, the pressure sealable quality of the product is lost. However, if one desires to use the edible sheet itself, for example, for preparing ribbons for tying meat and sausage products, the treatment with a cross-linking agent is performed on the sheet itself. Any food grade cross-linking agent is suitable to be used for this purpose. Exemplary of particularly suitable cross-linking agents which may be utilized herein are aluminum sulfate, aluminum ammonium sulfate, ferric chloride, ferric ammonium sulfate, glyoxol, formaldehyde, tannic acid, and the like.

If the mixing of the components of the present invention to prepare the films is carried out in the presence of air, it has been found to be desirable to deaerate the mixture prior to forming the film so as to prevent the introduction of air bubbles into the film which would reduce the otherwise high tensile strength of these films. However, when mixing is carried out in a vacuum no such problem arises and deaeration is not necessary.

Though the basic formula for the compositions of this invention calls for mixtures of collagen and caesin alone, in many cases it is desirable to vary the general character of the composition, while retaining its edible, pressure sealable character. This can be accomplished by incorporating other compatible materials with the collagen-casein mixture. For example, these compatible materials may be incorporated in order to vary the wet or dry tensile strength of the composition, or to vary the physical appearance of the composition, or to vary the self-adhesive character of the composition, or to vary the rate of drying of the composition, or to vary the degree of wet swelling of the composition. Exemplary of compatible materials which may be employed are gelatin, gums, natural resins, glue, bovine albumin, soy protein, peanut protein, starch, carboxy methyl cellulose and the like, and mixtures thereof. The amount of compatible material to be incorporated is variable; the amount utilized being dependent on the compound being added and the desired characteristics of the final product. But, generally, the amount of compatible material to be employed will not exceed 25% (based on dried weight of product), although greater amounts may be incorporated in some cases. Particularly advantageous compositions of the present invention can be prepared by incorporating a metal salt of alginic acid, such as sodium alginate, or a metal salt of pectinic acid, such as sodium pectinate and mixtures thereof, into the collagen-casein mixture. These compositions can be utilized without incorporating softeners or plasticizers therein since the salts act as lubricants for the collagen fibers and, thus, allow the casting of thinner films. The thinner films, however, have been found to have exceedingly high wet tensile strength as well as retaining the basic edible pressure sealable character of the compositions of the present invention.

The ratio of the amount of casein to the amount of collagen used to prepare the compositions of the present invention will also vary greatly depending on the desired characteristics of the products. It is important to note that generally the casein contributes the attribute of pressure sealability and the collagen fibers the tensile strength of the films and tubings of the present invention. Thus, by varying the ratio of these components, one may arrive at the most desirable product for his particular requirements. However, it has been found that compositions wherein the ingredients are present in a ratio of between about 0.2 part casein to 1 part collagen to about 4 parts casein to 1 part collagen are particularly suitable.

As indicated above, minor proportions of softening or plasticizing agents such as polyoxy alkylene glycol resins (e.g. ethylene oxide polymers), sorbitol, glycerine, dextrin, sucrose, glucose and the like and mixtures thereof, can be employed in formulating the compositions of this invention to soften and otherwise improve the properties of said compositions. It has been found, for example, that polyoxy alkylene glycol resins not only act as plasticizers but also promote the cohesion of the film on pressure sealing. Thus, quantities of such secondary agents, preferably not in excess of 10% (basis of solids content), may be desirably incorporated into the collagen-casein compositions of the present invention.

The following examples are set forth for the purpose of illustration only and are not to be construed as being limitative in any respect.

EXAMPLE I

Into a stainless steel one-quart Waring blendor was placed 263 grams of water. Agitation was begun and 1 gram each of sucrose and plasticizer (an ethylene oxide polymer sold under the trademark "Polyox WSR N-3000" by the Union Carbide Chemical Company) were added to the water. Then, 20 grams of "technical collagen" (25% hide collagen solids) were added in portions. Casein (15 grams) was then added, followed by the addition of 15 grams of ammonia (reagent grade, 28–30%). Agitation was continued for 30–45 seconds. The mixture was then deaerated by placing the whole Waring assembly in a vacuum chamber. The blendor was run intermittently while the chamber was being evacuated. When the pressure dropped to about 55 mm. of Hg the deaeration was complete. Using a Gardner knife, set at .035 inch, a wet film was cast onto a Mylar covered glass plate. The plate was then placed in an air tunnel at 150° F. to dry the film. The dry film was then cross-linked by soaking a 5% alum ($Al_2(SO_3)$ .18 $H_2O$) solution for 10 minutes. The film was then plasticized by soaking in a 5% glycerine solution for 2 minutes. The film was finally re-dried. This plasticized, cross-linked film was found to be moisture resistance and to have a dry tensile strength of about 8,000 p.s.i.

EXAMPLE II

By the method of Example I a film is prepared having the following proportion of ingredients:

|  | G. |
|---|---|
| Water | 250 |
| Plasticizer (ethylene oxide polymer, "Polyox WSR N-3000") | 2 |
| Technical Collagen (25% hide collagen solids) | 20 |
| Casein | 10 |
| Ammonia (reagent grade, 28%) | 15 |
| Starch | 5 |

I claim:

1. The method of preparing continuous edible films from mixtures containing collagen and casein which are pressure sealable and formable into tubular casings comprising: treating a flowable paste of about one part collagen to from about 0.2 to 4 parts casein with a material selected from the group consisting of a plasticizing agent in an amount up to about 10%, on the basis of solids content of the collagen and casein, and a lubricating material in an amount up to about 25%, by dried weight of the collagen and casein; adjusting the pH of the mixture to within a range sufficient to dissolve said casein, said pH being within one of the ranges from about 1.3 to about 3.5 and from about 8 to about 11; casting the resultant flowable paste composition to form a sheet of continuous film; and drying the film, said film being characterized as moisture-pressure sealable.

2. The method as set forth in claim 1 wherein said plasticizing agent is a material selected from the group consisting of a polyoxy alkylene glycol resin, sorbitol, glycerine, dextrin, sucrose, glucose and mixtures thereof.

3. The method as set forth in claim 1 wherein said lubricating material is a material selected from the group consisting of metal salts of alginic acid, metal salts of pectinic acid and mixtures thereof.

4. The method of claim 1 wherein the temperature of the flowable paste is below about 25° C.

5. The method of claim 1 wherein up to about 25%, by dried weight of said composition, of a material selected from the group consisting of gelatin, glue, gums, natural resins, bovine albumin, soy protein, peanut protein, starch and mixtures thereof is incorporated into the flowable paste.

6. The method of claim 1 wherein said resultant flowable paste is deaerated before being cast to form said continuous film.

7. The method of claim 1 wherein the dried continuous film is sealed into a tube and the tube is treated with a food grade cross-linking agent.

8. The method of claim 9 wherein the food grade cross-linking agent is selected from the group consisting of aluminum sulfate, aluminum ammonium sulfate, ferric chloride, ferric ammonium sulfate, glyoxol, tannic acid, formaldehyde, and mixtures thereof.

9. The method of preparing edible tubes and casings from mixtures containing collagen and casein comprising: treating a mixture of about 1 part collagen to from about 0.2 to 4 parts casein with a material selected from the group consisting of a plasticizing agent in an amount of up to 10%, on the basis of solids content of the collagen and casein, and a lubricating material in an amount up to about 25%, by dried weight of the collagen and casein to form a flowable paste composition; adjusting the pH of the mixture to within one of the ranges from about 1.3 to about 3.5 and from about 8 to about 11; casting the mixture to form a sheet of continuous film; drying said sheet of continuous film to form a moisture-pressure sealable film; sealing the film into a tube; and treating said tube with a food grade cross-linking agent.

References Cited
UNITED STATES PATENTS

| | | | |
|---|---|---|---|
| 2,469,546 | 3/1949 | Calhoun | 106—161 X |
| 2,802,745 | 8/1957 | Bosel | 99—176 |
| 2,971,814 | 2/1961 | Seligsberger | 99—176 |
| 2,988,451 | 6/1961 | Zahn | 99—176 |
| 3,346,402 | 10/1967 | Lieberman | 99—176 |
| 3,413,130 | 11/1968 | Rose | 99—176 |

FOREIGN PATENTS

| | | | |
|---|---|---|---|
| 669,068 | 7/1929 | France | 99—176 |
| 14,452 | 8/1956 | Germany | 99—176 |

FRANK W. LUTTER, Primary Examiner

R. HALPER, Assistant Examiner

U.S. Cl. X.R.

99—18; 106—147

UNITED STATES PATENT OFFICE
CERTIFICATE OF CORRECTION

Patent No. 3,695,902                     Dated October 3, 1972

Inventor(s) JOSEPH L. SHANK

It is certified that error appears in the above-identified patent and that said Letters Patent are hereby corrected as shown below:

The patent should show on its face that it is assigned to Swift & Company of Chicago, Illinois.

Column 1, line 23 - after cast to, cancel "a"; line 26 - after with a, cancel "good" and substitute therefor -- food --; line 30 - after September, cancel "19" and substitute therefor -- 18 --; line 36 - after specifically, cancel "is" and substitute therefor -- it --;

Column 2, line 21 - after is the, cancel "fast" and substitute therefor -- fact --; line 43 - after of a, cancel "sofening" and substitute therefor -- softening --, line 47 - after found to, cancel "tbe" and substitute therefor -- be --;

Column 3, line 33 - after collagen and, cancel "caesin" and substitute therefor -- casein --;

Column 4, line 45 - after moisture, cancel "resistance" and substitute therefor -- resistant --;

Column 5, line 25 - after claim, cancel "9" and substitute therefor -- 7 --.

Signed and sealed this 19th day of March 1974.

(SEAL)
Attest:

EDWARD M. FLETCHER, JR.          C. MARSHALL DANN
Attesting Officer                 Commissioner of Patents